US010815129B1

(12) United States Patent
Youngquist et al.

(10) Patent No.: US 10,815,129 B1
(45) Date of Patent: Oct. 27, 2020

(54) METHOD OF FABRICATING RIGID RADIATION REFLECTORS

(71) Applicant: United States of America as Represented by the Administrator of NASA, Washington, DC (US)

(72) Inventors: Robert C. Youngquist, Cocoa, FL (US); Tracy L. Gibson, Melbourne, FL (US); Jan M. Surma, Melbourne, FL (US); Jerry W. Buhrow, Titusville, FL (US); Mark A. Nurge, Oviedo, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 134 days.

(21) Appl. No.: 16/116,146

(22) Filed: Aug. 29, 2018

Related U.S. Application Data

(63) Continuation-in-part of application No. 15/277,446, filed on Sep. 27, 2016, now Pat. No. 10,273,024.

(60) Provisional application No. 62/552,768, filed on Aug. 31, 2017, provisional application No. 62/239,735, filed on Oct. 9, 2015.

(51) Int. Cl.
| | | |
|---|---|---|
| *C01D 3/10* | (2006.01) | |
| *C01F 11/22* | (2006.01) | |
| *C01G 27/02* | (2006.01) | |
| *C01F 17/206* | (2020.01) | |
| *B64G 1/54* | (2006.01) | |

(52) U.S. Cl.
CPC ............... *C01D 3/10* (2013.01); *C01F 11/22* (2013.01); *C01F 17/206* (2020.01); *C01G 27/02* (2013.01); *B64G 1/54* (2013.01)

(58) Field of Classification Search
CPC ...... G02B 5/0833; G02B 5/26; G02B 5/0816; G02B 5/085; G02B 5/0858; C03C 17/36; C01D 3/10; C01F 17/206; C01F 11/22; C01G 27/02; B64G 1/54
USPC ........ 428/328, 334, 338, 364, 372; 359/359, 359/360; 427/133, 445; 264/43, 44, 48, 264/643, 129, 338
See application file for complete search history.

(56) References Cited

U.S. PATENT DOCUMENTS

| | | | | |
|---|---|---|---|---|
| 4,828,354 A * | 5/1989 | Yoshida | ................. | G02B 6/102 385/128 |
| 5,825,543 A * | 10/1998 | Ouderkirk | ............ | G02B 5/3008 359/487.02 |
| 6,777,610 B2 * | 8/2004 | Yamada | ................. | B32B 17/10 136/244 |
| 6,979,499 B2 * | 12/2005 | Walck | ............... | B32B 17/10036 250/484.4 |
| 7,039,264 B2 * | 5/2006 | Bryan | ....................... | B32B 9/04 385/14 |
| 7,476,889 B2 * | 1/2009 | DeMeo | ................ | G01V 5/0008 250/516.1 |
| 7,767,753 B2 * | 8/2010 | Fukui | .................... | B22F 1/0059 524/394 |
| 8,749,881 B2 * | 6/2014 | Banerjee | .............. | G02B 5/0825 359/359 |
| 9,096,799 B2 * | 8/2015 | Zhou | ....................... | H01J 63/04 |
| 9,254,089 B2 * | 2/2016 | Tearney | ............... | A61B 5/0062 |
| 9,715,047 B2 * | 7/2017 | Banerjee | ............. | G02B 5/0833 |
| 10,273,024 B1 * | 4/2019 | Youngquist | ............. | B64G 1/58 |
| 10,488,566 B2 * | 11/2019 | Lenef | .................... | G02B 5/0858 |
| 2008/0204861 A1 * | 8/2008 | Shiraishi | .............. | G02B 5/0891 359/359 |
| 2009/0153953 A1 * | 6/2009 | Banerjee | ................ | G02B 13/14 359/359 |
| 2010/0316821 A1 * | 12/2010 | Chang | ................... | B29C 48/255 428/35.8 |
| 2011/0091658 A1 * | 4/2011 | Banerjee | ............. | G02B 5/0833 427/427.4 |
| 2011/0128616 A1 * | 6/2011 | Banerjee | ................ | G02B 5/085 359/359 |
| 2011/0134515 A1 * | 6/2011 | Banerjee | ................ | G02B 5/283 359/359 |
| 2012/0011850 A1 * | 1/2012 | Hebrink | ................ | F24S 30/425 60/641.15 |
| 2013/0026371 A1 * | 1/2013 | Holloway | ............. | G01T 1/2002 250/362 |
| 2013/0320220 A1 * | 12/2013 | Donowsky | ............. | B32B 15/08 250/366 |
| 2014/0060643 A1 * | 3/2014 | Martin | ................... | B01J 35/004 136/256 |
| 2014/0226197 A1 * | 8/2014 | Natsumeda | .......... | G03B 21/204 359/241 |
| 2015/0033988 A1 * | 2/2015 | Wu | ....................... | G02B 5/285 106/417 |

(Continued)

OTHER PUBLICATIONS

"Room Temperature", Merriam-Webster On-line, 2010. (Year: 2010).*
Youngquist et al., "Achieving cryogenic temperatures in deep space using a coating," Optics Letters 41, No. 6 (2016): 1086-1089.
Youngquist et al., "Cryogenic Selective Surfaces," Final Report on a Phase I NIAC Study, (2016) 1-63.

*Primary Examiner* — Douglas J McGinty
(74) *Attorney, Agent, or Firm* — Jonathan J. Leahy; Mark W. Homer (57) ABSTRACT

A rigid radiation reflector is fabricated from a powdered material transparent to light in a wavelength band extending from approximately 0.2 micrometers to at least 8 micrometers. The powdered material is dispersed in a liquid wherein the powdered material is at least 95% insoluble in the liquid. The resulting mixture is molded under pressure at room temperature and then sintered to generate a porous solid. The porous solid is cooled to room temperature. A surface of the porous solid is then coated with a light-reflecting metal.

28 Claims, 4 Drawing Sheets

(56) References Cited

U.S. PATENT DOCUMENTS

| | | | |
|---|---|---|---|
| 2015/0103398 A1* | 4/2015 | Banerjee | G02B 5/282 |
| | | | 359/360 |
| 2015/0369928 A1* | 12/2015 | Reese | H01L 51/42 |
| | | | 250/362 |
| 2016/0176223 A1* | 6/2016 | Degott | B42D 25/378 |
| | | | 283/85 |
| 2017/0248746 A1* | 8/2017 | Banerjee | G02B 5/003 |
| 2017/0253070 A1* | 9/2017 | Loginov | B42D 25/41 |
| 2017/0315276 A1* | 11/2017 | Dasbach | G02B 5/0858 |
| 2018/0045865 A1* | 2/2018 | Banerjee | G02B 5/0858 |
| 2018/0111406 A1* | 4/2018 | Loginov | B42D 25/387 |

\* cited by examiner

METHOD OF FABRICATING RIGID RADIATION REFLECTORS

CROSS REFERENCE TO RELATED APPLICATIONS

This application claims the benefit of priority to U.S. Provisional Patent Application Ser. No. 62/552,768, filed Aug. 31, 2017, and is a continuation-in-part of U.S. patent application Ser. No. 15/277,446 entitled "Radiation Reflector and Emitter," filed on Sep. 20, 2016, which claims the benefit of priority under 35 USC § 119(e) of U.S. Provisional Patent Application Ser. No. 62/239,735, filed on Oct. 9, 2015, the contents of which are incorporated herein by reference.

ORIGIN OF THE INVENTION

The invention described herein was made in the performance of work under NASA contracts and by an employee of the United States Government and is subject to the provisions of Section 20135(b) of the National Aeronautics and Space Act, Public Law 111-314, § 3 (124 Stat. 3330, 51 U.S.C. Chapter 201) and 35 U.S.C. § 202, and may be manufactured and used by or for the Government for governmental purposes without the payment of any royalties thereon or therefore.

BACKGROUND OF THE INVENTION

Field of the Invention

This invention relates to radiation reflectors. More specifically, the invention is a method of fabricating a rigid radiation reflector for use in protection from solar radiation.

Description of the Related Art

There are many challenges involved in deep space exploration. A number of these challenges can be advanced or even solved by the development of structure coatings that reject most of the Sun's energy while still providing for far-infrared radiative emission. For example, current structure-coating technology used on space-based storage tanks, tank support struts, etc., limits the storage of liquid oxygen in deep space to days or weeks (i.e., not long enough to support a trip to Mars or operate a deep-space liquid oxygen storage depot). Further, the operation of superconductors in space is limited as it is difficult to maintain superconductors at optimal low temperatures. Accordingly, a critical aspect of spacecraft and spacecraft system design is the maintenance of stable and low operating temperatures by accounting for internal heat generation, irradiance from the Sun and planetary bodies, and radiative emission. For some space applications, thicker reflective coatings may be needed on certain Sun-facing surfaces of spacecraft. In such cases, it is more efficient to attach rigid "tiles" to surfaces requiring solar protection. Other applications requiring highly effective solar reflectors involve missions that include a near-Sun approach.

SUMMARY OF THE INVENTION

Accordingly, it is an object of the present invention to provide a method of fabricating rigid radiation reflectors.

Another object of the present invention is to provide a method of fabricating rigid solar radiation reflectors capable of reflecting more than 99% of incoming solar radiation.

Other objects and advantages of the present invention will become more obvious hereinafter in the specification and drawings.

In accordance with the present invention, a method of fabricating a rigid radiation reflector is based on a powdered material transparent to light in a wavelength band extending from approximately 0.2 micrometers to at least 8 micrometers. The powdered material is dispersed in a liquid wherein the powdered material is at least 95% insoluble in the liquid. The resulting mixture of the liquid and the powdered material is molded under pressure at room temperature. Following the molding step, the mixture is sintered to generate a porous solid. The porous solid is cooled to room temperature. A surface of the porous solid is then coated with a light-reflecting metal.

BRIEF DESCRIPTION OF THE DRAWING(S)

Other objects, features, and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
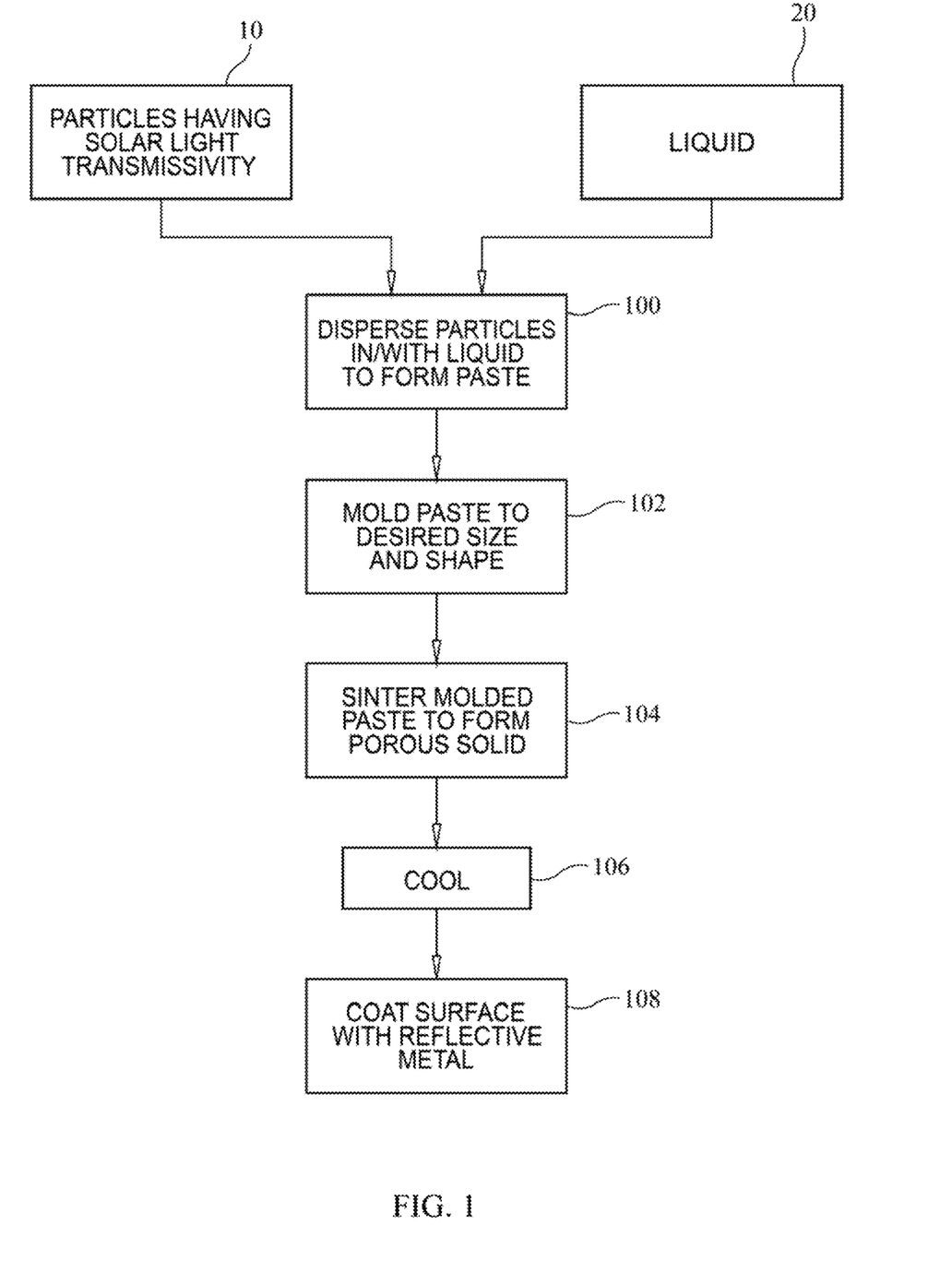
FIG. 1 is a flow diagram of the process steps used to fabricate a rigid radiation reflector in accordance with an embodiment of the present invention.

Referring now to the drawings and more particularly to FIG. 1, a flow diagram is illustrated of a method of fabricating a rigid radiation reflector in accordance with an embodiment of the present invention. By way of example, an illustrated embodiment of the present invention described herein will focus on use of materials and processes that yield rigid solar radiation reflectors capable of reflecting more that 99% of incoming solar radiation, while also emitting radiation such as heat generated by a body to which the solar radiation reflectors are coupled. Accordingly, the rigid radiation reflectors fabricated as described herein are ideally suited for coupling to spacecraft structures or systems that need to maintain cryogenic temperatures in the presence of solar radiation.

The two materials used in the fabrication method of the present invention are particles 10 and liquid 20. Particles 10 are materials that transmit light in the wavelength band found in solar radiation. In general, the light-transmitting wavelength spectrum or band of interest ranges from approximately 0.2 micrometers or microns to at least 8 microns. This wavelength band includes all visible, ultraviolet, and near to mid-infrared radiation originating from the Sun and planetary bodies. Suitable materials for particles 10 include barium fluoride, potassium bromide, hafnium dioxide, and yttrium oxide. Particles 10 generally have an average dimension in a range of approximately 0.1 microns to approximately 0.3 microns such that particles 10 can be a powdered form of the material of choice. Regardless of the choice of material for particles 10, the material's starting purity must be at least 99.9% with the small percentage of impurity(ies) being mostly transparent to the wavelength spectrum of interest.

Liquid 20 is selected such that particles 10 are at least 95% insoluble in liquid 20. That is, when particles 10 and liquid 20 are mixed together, at least 95% of particles 10 do not dissolve in liquid 20 but, instead, are dispersed in/with liquid 20. The insolubility of particles 10 in/with liquid 20 assures that the light transmissivity of the ultimately-fabricated rigid reflector is commensurate with the transmissivity of particles 10. Liquid 20 includes deionized water and methanol with the choice thereof being predicated on the material used for particles 10 as will be described further below. The starting purity of liquid 20 must be at least 99.9%.

Particles 10 and liquid 20 are mixed at step 100 to disperse particles 10 in/with liquid 20 in order to form a paste whose consistency will vary based on the weight percent of liquid 20 used in the mixture. For higher weight percent values of liquid 20, particles 10 are added to liquid 20. For lower weight percent values of liquid 20, liquid 20 can be added to a supply of particles 10. Step 100 is carried out at room temperature.

The paste generated at step 100 is next molded at step 102 in order to create a desired shape and size. Shapes can include, but are not limited to, flat or shaped plates, disks, panels, etc. Sizes can be varied to satisfy application requirements and/or specified structural attributes. Accordingly, it is to be understood that the shape and size of the ultimately molded paste are not limitations of the present invention.

Figure 2:
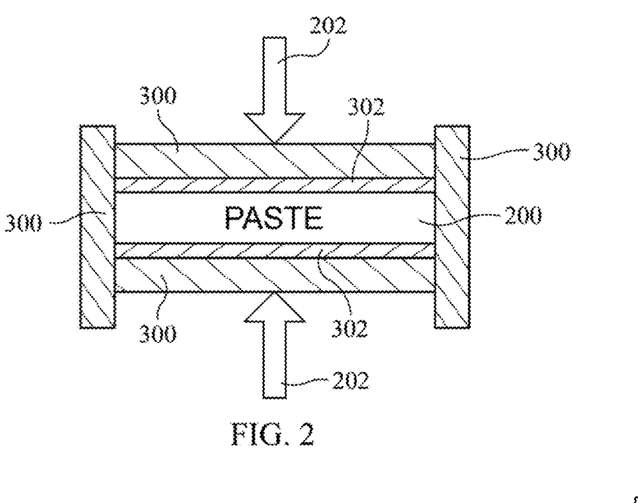
FIG. 2 is a cross-sectional schematic view of a molding configuration using a metal mold in accordance with an embodiment of the present invention.
Figure 3:
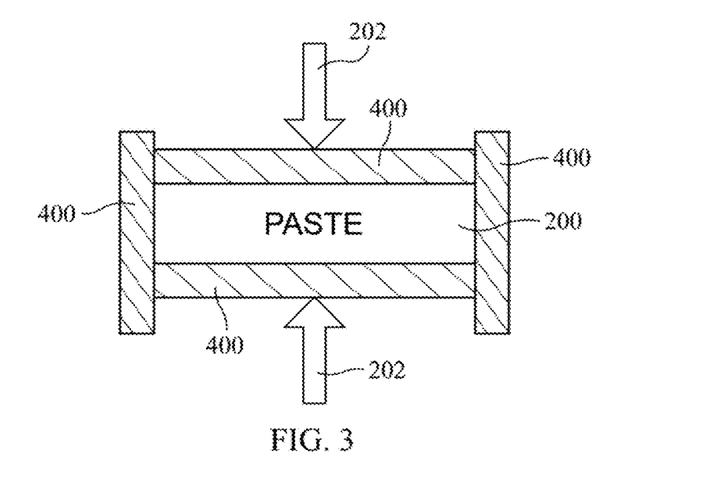
FIG. 3 is a cross-sectional schematic view of a molding configuration using a ceramic mold in accordance with another embodiment of the present invention.

Referring additionally to FIGS. 2 and 3, molding step 102 can be carried out using a metal mold (FIG. 2) or a ceramic mold (FIG. 3) without departing from the scope of the present invention. In each case, the paste 200 generated by step 102 is compressed under pressure (referenced by arrows 202). When using a metal mold 300, paste 200 can be placed between two pieces of material 302 that are inert with respect to the material ingredients in paste 200 in order to prevent any reaction therebetween that could negatively impact the optical properties of the ultimate reflector fabricated in accordance with the present invention. For example, for the materials mentioned above, material 302 can be a layer or film of a polymeric material. Material 302 could also be used to encase paste 200 without departing from the scope of the present invention. The above-described protective materials layer/film can be omitted if molding step 102 is carried out using a ceramic mold 400 (FIG. 3) in which case paste 200 can be placed in direct contact with the mold since ceramic material will not react with any of the materials used in paste 200. In either mold situation, the pressure 202 is predicated on the choice of materials for particles 10 and the ultimate porosity or void volume of the fabricated rigid reflector.

The resulting molded paste mixture is then sintered at step 104 to form a porous solid that resembles a rigid sponge. More specifically, sintering step 104 in the present invention involves heating the molded paste mixture from step 102 without any additional pressure being applied thereto. The maximum temperature of the sintering step is predicated on the materials used for particle 10. For example, the sintering process can follow a series of heat-and-hold "steps," a straight-line increase in temperature, or some other heat-increase function without departing from the scope of the present invention.

Figure 4:
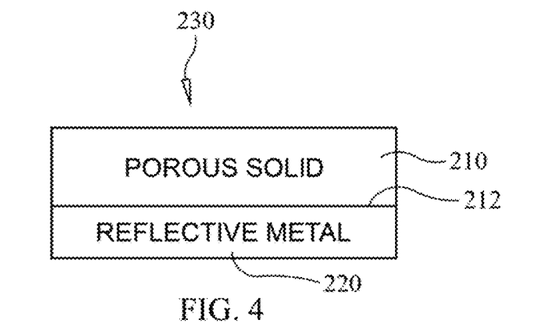
FIG. 4 is a schematic view of a rigid radiation reflector fabricated in accordance with the present invention.

After the completion of sintering step 104, at step 106 the porous solid is cooled to room temperature. For example, the porous solid can be left in the sintering furnace as it cools to room temperature. Finally, at step 108, a single surface of the cooled porous solid is coated with a light-reflecting metal (e.g., silver, aluminum, tungsten, tantalum, or other highly reflective material such as stainless steel) whose reflectivity is high in the spectral regions where the porous solid is transparent (i.e., typically in the infrared regions of the Sun's spectrum). The results of step 108 are shown in FIG. 4 where the sintering-generated porous solid 210 has a surface 212 thereof coated with a light-reflecting metal 220 thereby yielding a rigid radiation reflector 230. The uncoated surface of porous solid 210 is the surface of reflector 230 that will face the source of incoming radiation (e.g., the Sun), while metal coating 220 of reflector 230 will ultimately be positioned adjacent to or coupled to a body (not shown) that is to be protected from incoming radiation. The coating process can use any of a number of suitable coating or deposition processes (e.g., physical vapor deposition) without departing from the scope of the present invention.

The table below lists several material/liquid combinations used to fabricate rigid radiation reflectors in accordance with the present invention. The table also lists suitable liquid weight percent ranges, molding pressure ranges, maximum sintering temperature, and resulting void volume ranges exhibited by the fabricated porous solid.

| Material | Liquid | Weight Percent Liquid | Molding Pressure (kg/cm$^2$) | Maximum Sintering Temperature (K) | Void Volume Percent |
| --- | --- | --- | --- | --- | --- |
| Barium fluoride | Deionized Water | 9.0-28.0 | 1.3-212.2 | 1053.15 | 10.4-61.0 |
| Potassium bromide | Methanol | 10.0-15.0 | 4.3-154.2 | 698.15 | 9.8-46.9 |
| Hafnium dioxide | Deionized water | 9.5-10.3 | 38.5-77.1 | 1323.15 | 30.5-66.8 |
| Yttrium oxide | Deionized water | 9.0-11.0 | 21.9-397.9 | 1323.15 | 30.5-74.0 |

For many deep space applications it is necessary to have a material that can reflect more than 99% of the Sun's irradiant power. The Sun is a broadband light source with emission from the ultraviolet (i.e., 0.2 microns), through a peak in the visible (i.e., approximately 0.5 microns), and then decaying into the infrared. The more significant infrared radiation has a wavelength between 0.7 and 12 microns. The Sun emits at wavelengths beyond 12 microns, but the spectral power in this long wave region is small and can be ignored for purposes of the present invention. Accordingly, in order to achieve 99% or better reflection of the Sun's power, a reflective material must have minimal absorption across this region, i.e., from around 0.2 microns to about 8-12 microns. Many broadband materials meet this requirement to include barium fluoride, potassium bromide, hafnium dioxide, and yttrium oxide, all of which are listed in the table above. Potassium bromide has the broadest transmission spectrum and is generally thought of as an ideal material for reaching very low temperatures required for superconducting and cryogenic applications. However, potassium bromide dissolves easily in water and can be difficult to use. Barium fluoride absorbs more radiation than potassium bromide, but has less water absorption. The oxides have higher melting temperatures and are hydrophobic such that they are subject to minimal water issues. However, oxides' optical properties are not as well-known thereby adding some uncertainty to their performance, but they may be prime candidates for fabricating a solar shield to approach the Sun since their enhanced tolerance for heat may offset a small amount of additional solar absorbance. Further, if one of the oxides is shown to have optical properties comparable to barium fluoride, then its high index and water repulsion may make it a prime candidate for cryogenic applications as well. Accordingly, the particular choice of material from those presented herein can be dictated by an application's requirements.

A number of rigid radiation reflectors were fabricated in accordance with the material/liquid selections, processing steps, and processing limits or ranges described and enumerated above. Several of the resulting porous solids and rigid reflectors were tested for reflectivity in the wavelength range from approximately 0.2-0.3 microns to approximately 1.3 microns. In each case, tests of reflectivity were made with a spectrometer calibrated with SPECTRALON, i.e., a fluoropolymer having the highest diffuse reflectance of any known material or coating over the ultraviolet, visible, and near-infrared regions of the spectrum. That is, and as is known in the art, SPECTRALON's reflectance is greater than 99% over a range from 0.4 microns to 1.5 microns, and is greater than 95% over a range from 0.25 microns to 2.5 microns.

Figure 5:
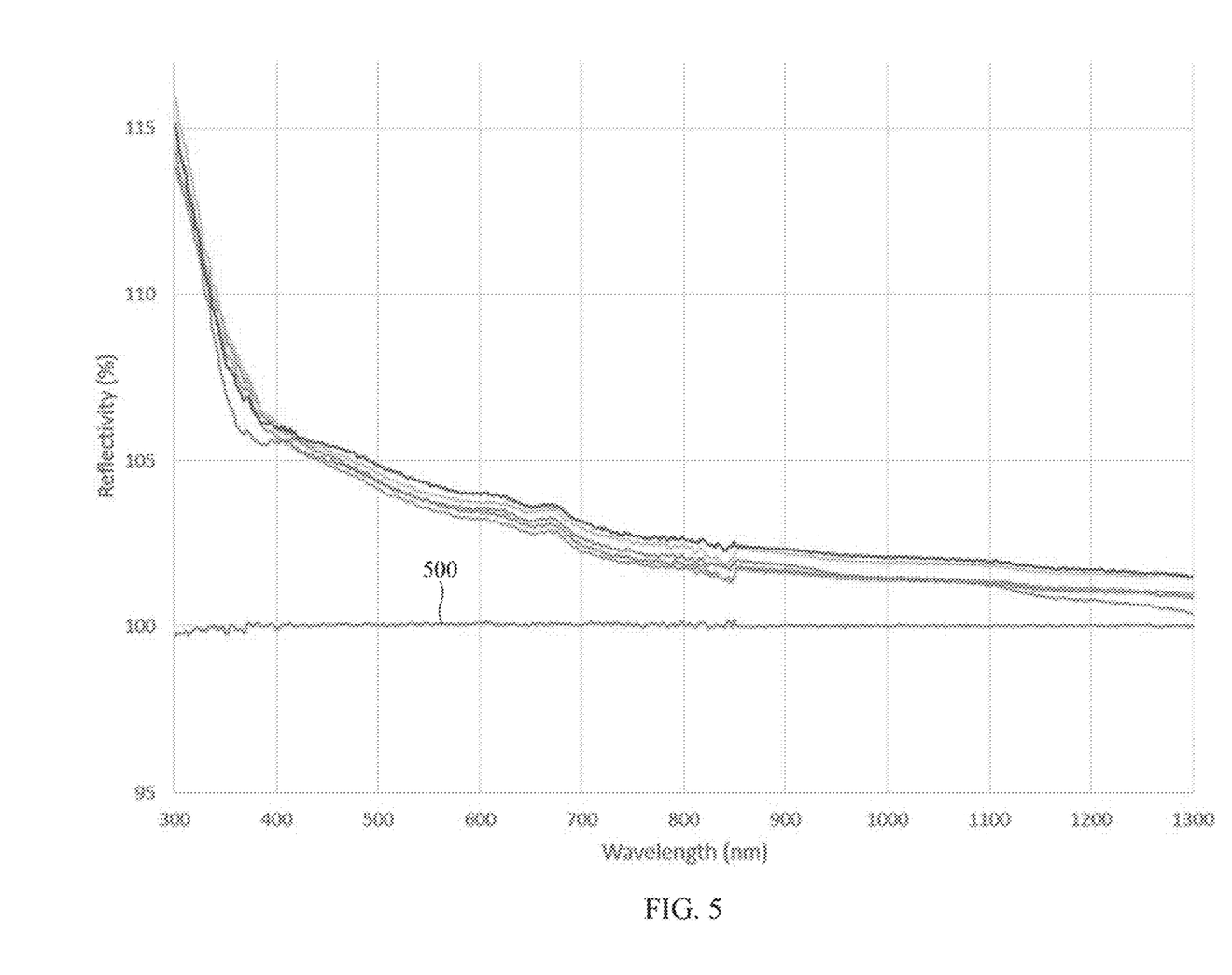
FIG. 5 is a plot of reflectivity versus wavelength for a plurality of barium fluoride-based rigid reflectors fabricated in accordance with embodiments of the present invention.
Figure 6:
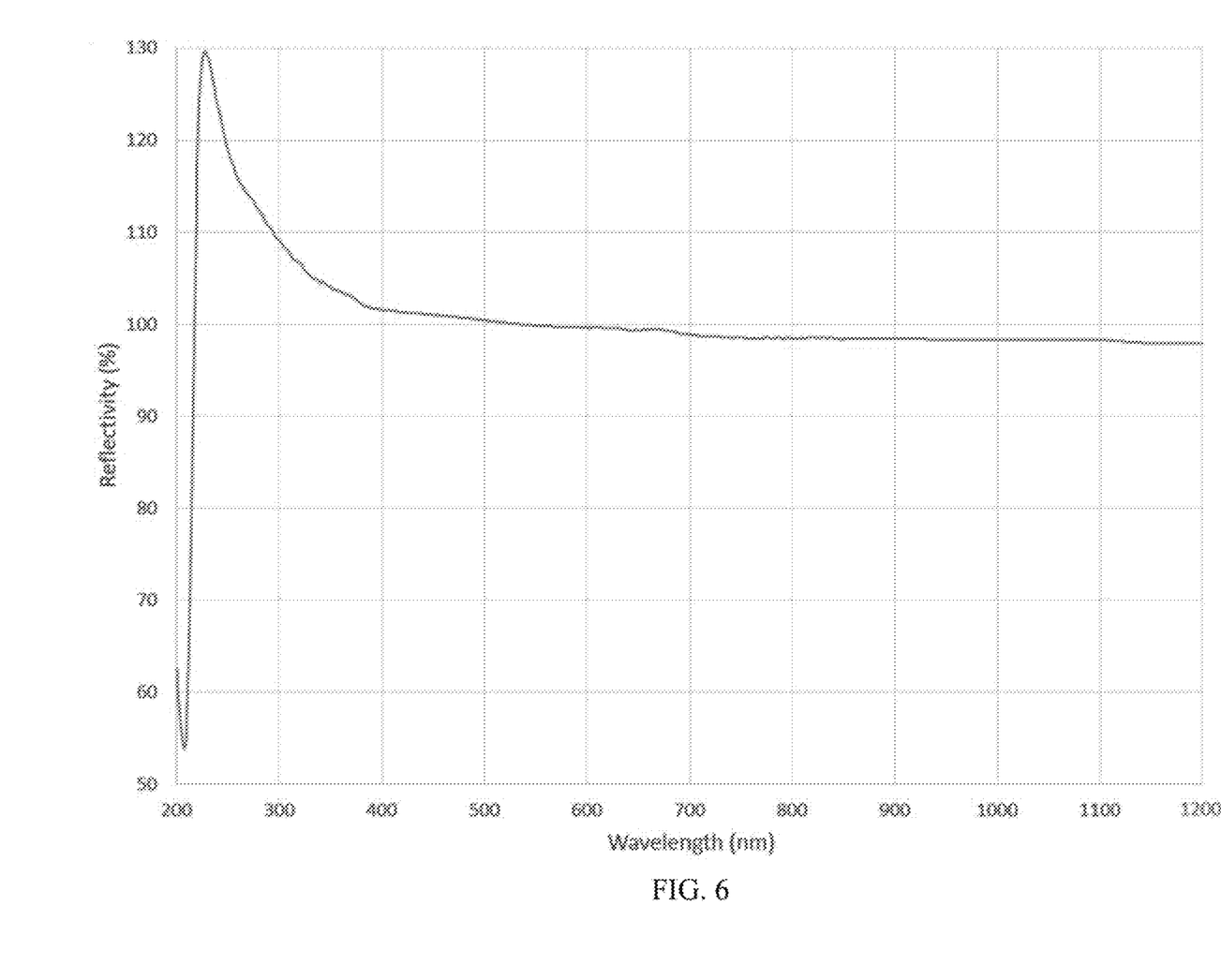
FIG. 6 is a plot of reflectivity versus wavelength for an yttrium oxide-based rigid reflector fabricated in accordance with an embodiment of the present invention.

Referring first to FIG. 5, the reflectivity curves for a number of barium fluoride-based rigid radiation reflectors (i.e., the cooled porous solid coated on one surface thereof with silver) are illustrated. It is noted that all barium fluoride-based samples had a reflectivity in excess of that of the SPECTRALON calibration sample (represented by trace 500) over the entire tested spectrum as evidenced by a reflectivity of greater than 100%. In FIG. 6, an yttrium oxide porous solid was tested without any reflective metal coating on one surface thereof. Once again, the tested material had a reflectivity greater than or approximately equal to that of the SPECTRALON calibration material over the entire tested spectrum as evidenced by a reflectivity of greater than or approximately equal to 100%. Accordingly, reflectivity percentages would only increase when the yttrium oxide porous solid is coated on one surface thereof with a reflective metal.

The advantages of the present invention are numerous. The fabrication method described herein is suitable for constructing a variety of rigid radiation reflectors that are also capable of emitting radiation generated by the body to which the reflector is attached. The radiation reflectors have been shown to reflect better than the current state-of-the-art reflector SPECTRALON. Accordingly, rigid radiation reflectors fabricated in accordance with the present invention are ideally suited for use on spacecraft tasked with missions near the Sun.

The description of the present invention has been presented for purposes of illustration and description, but is not intended to be exhaustive or limited to the disclosure in the form disclosed. Many modifications and variations will be apparent to those of ordinary skill in the art without departing from the scope of the invention. The described embodiments were chosen and described in order to best explain the principles of the invention and the practical application, and to enable others of ordinary skill in the art to understand the invention for various embodiments with various modifications as are suited to the particular use contemplated.

What is claimed as new and desired to be secured by Letters Patent of the United States is:

We claim:
1. A method of fabricating a rigid radiation reflector, comprising the steps of:
   providing a powdered material transparent to light in a wavelength band extending from approximately 0.2 micrometers to at least 8 micrometers;
   dispersing said powdered material in a liquid wherein said powdered material is at least 95% insoluble in said liquid, wherein a mixture of said liquid and said powdered material is generated;
   molding said mixture under pressure at room temperature;
   sintering said mixture following said step of molding to generate a porous solid;
   cooling said porous solid to room temperature; and
   coating a surface of said porous solid with a light-reflecting metal.
2. A method according to claim 1, wherein said powdered material is selected from the group consisting of barium fluoride, potassium bromide, hafnium dioxide, and yttrium oxide.
3. A method according to claim 1, wherein said powdered material comprises potassium bromide, and wherein said liquid comprises methanol.
4. A method according to claim 1, wherein said powdered material is selected from the group consisting of barium fluoride, hafnium dioxide, and yttrium oxide, and wherein said liquid comprises deionized water.
5. A method according to claim 1,
   wherein said powdered material comprises barium fluoride,
   wherein said liquid comprises deionized water,
   wherein said mixture comprises a weight percent of said deionized water in a range of 9.0 to 28.0 weight percent,
   wherein said step of molding is carried out at a pressure in a range of 1.3 to 212.2 kilograms per square centimeter, and
   wherein said step of sintering is carried out to a maximum temperature of 1053.15 K.
6. A method according to claim 1,
   wherein said powdered material comprises yttrium oxide,
   wherein said liquid comprises deionized water,
   wherein said mixture comprises a weight percent of said deionized water in a range of 9.0 to 11.0 weight percent,
   wherein said step of molding is carried out at a pressure in a range of 21.9 to 397.9 kilograms per square centimeter, and
   wherein said step of sintering is carried out to a maximum temperature of 1323.15 K.
7. A method according to claim 1, wherein said light-reflecting material is selected from the group consisting of silver, aluminum, tungsten, tantalum, and stainless steel.
8. A method of fabricating a rigid radiation reflector, comprising the steps of:
   providing a powdered material transparent to light in a wavelength band extending from approximately 0.2 micrometers to at least 8 micrometers;
   dispersing said powdered material in a liquid wherein said powdered material is at least 95% insoluble in said liquid, wherein a mixture of said liquid and said powdered material is generated;

molding said mixture under pressure at room temperature;

sintering said mixture following said step of molding to generate a rigid sponge having a void volume in a range of 9.8% to 74.0%;

cooling said rigid sponge to room temperature; and coating a surface of said rigid sponge with a light-reflecting metal.

9. A method according to claim 8, wherein said powdered material is selected from the group consisting of barium fluoride, potassium bromide, hafnium dioxide, and yttrium oxide.

10. A method according to claim 8, wherein said powdered material comprises potassium bromide, and wherein said liquid comprises methanol.

11. A method according to claim 8, wherein said powdered material is selected from the group consisting of barium fluoride, hafnium dioxide, and yttrium oxide, and wherein said liquid comprises deionized water.

12. A method according to claim 8,
wherein said powdered material comprises barium fluoride,
wherein said liquid comprises deionized water,
wherein said mixture comprises a weight percent of said deionized water in a range of 9.0 to 28.0 weight percent,
wherein said step of molding is carried out at a pressure in a range of 1.3 to 212.2 kilograms per square centimeter, and
wherein said step of sintering is carried out to a maximum temperature of 1053.15 K.

13. A method according to claim 8,
wherein said powdered material comprises yttrium oxide,
wherein said liquid comprises deionized water,
wherein said mixture comprises a weight percent of said deionized water in a range of 9.0 to 11.0 weight percent,
wherein said step of molding is carried out at a pressure in a range of 21.9 to 397.9 kilograms per square centimeter, and
wherein said step of sintering is carried out to a maximum temperature of 1323.15 K.

14. A method according to claim 8, wherein said light-reflecting material is selected from the group consisting of silver, aluminum, tungsten, tantalum, and stainless steel.

15. A method of fabricating a rigid radiation reflector, comprising the steps of:
providing particles of a material transparent to light in a wavelength band extending from approximately 0.2 micrometers to at least 8 micrometers, said particles having an average dimension in a range of approximately 0.1 microns to approximately 0.3 microns;
dispersing said particles in a liquid wherein at least 95% of said particles are dispersed and insoluble in said liquid;
molding said particles in said liquid under pressure at room temperature;
sintering, after said step of molding, said particles in said liquid to generate a rigid sponge having a void volume in a range of 9.8% to 74.0%;
cooling said rigid sponge to room temperature; and
coating a surface of said rigid sponge with a light-reflecting metal.

16. A method according to claim 15, wherein said material is selected from the group consisting of barium fluoride, potassium bromide, hafnium dioxide, and yttrium oxide.

17. A method according to claim 15, wherein said material comprises potassium bromide, and wherein said liquid comprises methanol.

18. A method according to claim 15, wherein said material is selected from the group consisting of barium fluoride, hafnium dioxide, and yttrium oxide, and wherein said liquid comprises deionized water.

19. A method according to claim 15,
wherein said material comprises barium fluoride,
wherein said liquid comprises deionized water,
wherein said step of dispersing uses a weight percent of said deionized water in a range of 9.0 to 28.0 weight percent,
wherein said step of molding is carried out at a pressure in a range of 1.3 to 212.2 kilograms per square centimeter, and
wherein said step of sintering is carried out to a maximum temperature of 1053.15 K.

20. A method according to claim 15,
wherein said material comprises yttrium oxide,
wherein said liquid comprises deionized water,
wherein said step of dispersing uses a weight percent of said deionized water in a range of 9.0 to 11.0 weight percent,
wherein said step of molding is carried out at a pressure in a range of 21.9 to 397.9 kilograms per square centimeter, and
wherein said step of sintering is carried out to a maximum temperature of 1323.15 K.

21. A method according to claim 15, wherein said light-reflecting material is selected from the group consisting of silver, aluminum, tungsten, tantalum, and stainless steel.

22. A method of fabricating a rigid radiation reflector, comprising the steps of:
providing a paste of a powdered material and a liquid, said powdered material being transparent to light in a wavelength band extending from approximately 0.2 micrometers to at least 8 micrometers, said powdered material being at least 95% insoluble in said liquid;
molding said paste under pressure at room temperature to generate a molded paste;
sintering said molded paste to generate a porous solid;
cooling said porous solid to room temperature; and
coating a surface of said porous solid with a light-reflecting metal.

23. A method according to claim 22, wherein said powdered material is selected from the group consisting of barium fluoride, potassium bromide, hafnium dioxide, and yttrium oxide.

24. A method according to claim 22, wherein said powdered material comprises potassium bromide, and wherein said liquid comprises methanol.

25. A method according to claim 22, wherein said powdered material is selected from the group consisting of barium fluoride, hafnium dioxide, and yttrium oxide, and wherein said liquid comprises deionized water.

26. A method according to claim 22,
wherein said powdered material comprises barium fluoride,
wherein said liquid comprises deionized water,
wherein said paste comprises a weight percent of said deionized water in a range of 9.0 to 28.0 weight percent,
wherein said step of molding is carried out at a pressure in a range of 1.3 to 212.2 kilograms per square centimeter, and wherein said step of sintering is carried out to a maximum temperature of 1053.15 K.

27. A method according to claim 22,
wherein said powdered material comprises yttrium oxide,
wherein said liquid comprises deionized water,
wherein said paste comprises a weight percent of said deionized water in a range of 9.0 to 11.0 weight percent,
wherein said step of molding is carried out at a pressure in a range of 21.9 to 397.9 kilograms per square centimeter, and
wherein said step of sintering is carried out to a maximum temperature of 1323.15 K.

28. A method according to claim 22, wherein said light-reflecting material is selected from the group consisting of silver, aluminum, tungsten, tantalum, and stainless steel.

* * * * *